United States Patent [19]

Berman

[11] Patent Number: 4,476,674
[45] Date of Patent: Oct. 16, 1984

[54] POWER GENERATING PLANT EMPLOYING A REHEAT PRESSURIZED FLUIDIZED BED COMBUSTOR SYSTEM

[75] Inventor: Paul A. Berman, Plymouth Meeting, Pa.

[73] Assignee: Westinghouse Electric Corp., Pittsburgh, Pa.

[21] Appl. No.: 387,296

[22] Filed: Jun. 10, 1982

[51] Int. Cl.³ .............................................. F02C 6/18
[52] U.S. Cl. ............................. 60/39.182; 60/39.183; 60/39.464
[58] Field of Search ........... 60/39.181, 39.182, 39.183, 60/39.464, 39.12; 431/7, 170

[56] References Cited

U.S. PATENT DOCUMENTS

| | | | |
|---|---|---|---|
| 4,116,005 | 9/1978 | Willyoung | 60/39.181 |
| 4,223,529 | 9/1980 | Willyoung | 60/39.181 |
| 4,253,300 | 3/1981 | Willyoung | 60/39.182 |

FOREIGN PATENT DOCUMENTS 2076062  11/1981  United Kingdom ............. 60/39.182

OTHER PUBLICATIONS

Peterson & Lucke, *Commercial Powerplant Design Development for the Coal Fired Combined Cycle*, ASME Publication 77-JPGC-GT-6, 7/5/77.

Primary Examiner—Louis J. Casaregola
Attorney, Agent, or Firm—E. F. Possessky

[57] ABSTRACT

A reheat pressurized fluidized bed combustor system for an electric power plant includes an HP turbine which drives a compressor. Compressed clean air is directed through a combustor bed heat exchanger where it is heated to 1500° F. and then directed to the HP turbine inlet. After HP turbine expansion, the clean exhaust air is cooled to about 1100° F. and partly directed to the combustor bed for reheating and for bed fluidization and combustor support and partly bypassed around the combustor bed. Coal is burned in the combustor bed to heat the combustor outlet gases to 1600° F. which are directed to a cleanup system and then mixed with the bypass flow portion. The mixed flow is supplied to a low pressure turbine at a turbine inlet temperature of 1300° F. at which alkali matter is solidified and then exhausted to one or more heat recovery devices.

10 Claims, 6 Drawing Figures

POWER GENERATING PLANT EMPLOYING A REHEAT PRESSURIZED FLUIDIZED BED COMBUSTOR SYSTEM

BACKGROUND OF THE INVENTION

Pressurized fluidized bed combustors provide for firing electric power plants with coal in an economic and environmentally acceptable manner. Generally, pressurized fluidized beds can be installed in existing steam turbine plants to achieve better heat rates in repowering applications or in new power plants having both gas and steam turbines in a combined cycle.

In the basic fluidized bed combustor, granular particles are supported by an air distributor plate. The air introduced into the bed through the distributor plate causes the particles to go into suspension and circulate. In this condition, the bed material resembles a viscous fluid, or fluidized bed. As the air flow rate is increased, bubbles of air form in the bed, giving it the appearance of a violently boiling liquid. The granular particles then move turbulently to promote good gas-to-solids contact.

If the bed is heated and a fuel is introduced, combustion occurs, with the fluidizing air becoming the combustion air. The turbulent bed motion can produce high combustion efficiency and homogeneous bed temperatures. The bed can be operated adiabatically or with heat-exchanging tubes within the bed to control the bed temperature. In general, the coolant used with an in-bed heat exchanger is either air or water.

The fluidized, turbulent bed provides a bed-to-tube heat transfer coefficient higher than the coefficient encountered in conventional forced-convection heat exchangers, thereby reducing the size requirement of the heat exchanger. The homogeneous bed temperature simplifies heat exchanger design and eliminates the possibility of hot spots.

Since almost any type of fuel can be burned in a fluidized bed, it is often used to burn unconventional materials. Coal, oil shale, heavy oil, sludge, solid waste, and wood chips have been used for fuel in a fluidized bed.

Such flexibility has value with the use of coal since coal combustion in a fluidized bed is independent of coal ash content. The only limits that the coal ash places on the fluidized bed combustor is the operating temperature, which is limited by the ash fusion point to less than 1800° F.

In the late 1950s, it was discovered that when coal was burned in a fluidized bed composed of limestone or dolomite particles, sulfur emissions are reduced via the reaction $2SO_2 + 2CaO + O_2 \rightarrow 2CaSO_4$. Therefore, a fluidized bed combustor offers an alternative to a conventional coal fired plant with a scrubber. The fluidized bed can burn coals of varying sulfur content while maintaining low sulfur emissions by varying the limestone or dolomite feed to maintain the proper calcium-to-sulfur molar ratio. Unlike a scrubber, no equipment modifications are necessary to accomplish this balance. The calcium-sulfur reaction kinetics restrict the bed temperature to a minimum of 1450° F.

Fluidized bed combustors can be operated at atmospheric or at elevated air pressure to reduce unit size and produce other benefits. Although atmospheric fluidized bed (AFB) combustors have been in commercial use for years, particularly in Europe, the firing of a pressurized fluidized bed (PFB) combustor with coal is relatively recent.

At present, there are no commercial-scale PFB combustor power plants. The first large-scale PFB application in the United States dates back to the early 1940s with the advent of the fluid catalytic cracking process. The majority of the fluidized beds built since then have been used in the process industry. Some useful information relating to PFB coal combustion has been obtained from these years of experience, most notably in the areas of solids feeding and removal from a pressurized vessel, hot gas cleanup, and expansion turbine design. This information has resulted in commercially available equipment suitable for PFB combustion applications.

To obtain more specific data on coal combustion in a PFB, a number of test facilities have been built and operated, and a commercial-scale demonstration plant has been in the construction stage. Test facilities have provided extensive information on all design aspects of a PFB combustor system. PFB combustor operability has been demonstrated, and parametric investigations of the variables that affect the performance of the PFB combustion process have been conducted. Key design and operation relationships include:

- Sulfur capture as a function of sorbent type, gas residence time and calcium-to-sulfur molar ratio
- Pressure drop as a function of fluidizing velocity and bed depth
- Gas residence time as a function of fluidizing velocity and bed depth
- Combustion efficiency as a function of gas residence time, bed temperature and the percent excess air Test data have shown that a Ca/S ratio of 1.5 or greater captures at least 90 percent of sulfur, and that proper selection of process variables produce combustion efficiencies of 99 percent and higher without fines recycle. It has also been found that $NO_x$ emissions are relatively insensitive to process variables and are lower than the federal limit of 0.6 lb/106 BTU.

The solid waste from a coal-fired PFB combustor is readily handled and mainly contains sulfated calcium and inert coal ash. The amount of solid waste produced in a PFB combustor is less than that produced by a stack-gas scrubber.

Additional public information on the state of the PFB art is presented in a September 1980 Oak Ridge National Laboratory report ORNL/TM-7401 entitled State of the Art of Pressurized Fluidized Bed Combustion System by R. L. Graves and in a 1981 IEEE paper entitled Pressurized Fluidized Bed Combustion of Coal For Electric Power Generation—The AEP Approach.

For coal combustion, the PFB combustor has several advantages over the AFB combustor. Carbon utilization and sulfur-capture efficiency are increased and fewer nitrous oxides are emitted at the elevated PFB pressure.

Another advantage of a PFB combustor is that it can be used in a combined cycle power plant to yield overall cycle efficiencies much higher than AFB or pulverized coal-fired steam turbine units.

Another major advantage in pressurizing a fluidized bed coal combustion system resides in the fact that the furnace size and hence the number of coal feed points are inversely related to the furnace pressure. Thus, the furnace size and cost can be reduced markedly by pressurizing the unit. However, to supply pressurized air to the funace economically for a gas turbine must be driven by the high temperature, high pressure combustor effluent gases to develop the relatively large power needed to drive the combustor inlet air compressor. The use of a gas turbine enables the cycle efficiency to be increased with an elevated furnace pressure such as 10 atm in a combined gas turbine-steam cycle similar to that employed in many power plants in operation in the United States employing oil or gas as fuel. On the other hand, the problems presented by turbine corrosion, erosion, and deposition if coal is used as fuel have created development difficulties for such a system.

With this background of PFB technology, a challenge to continued progress is to conceptualize and implement a PFB combined cycle and plant system in which the advantages of PFB are harnessed efficiently within the present and prospective limits of gas cleanup technology as it relates to protection of hot turbine parts against corrosion, erosion and deposition.

SUMMARY OF THE INVENTION

A reheat pressurized fluidized bed combustor system for a power plant includes a compressor for pressurizing relatively clean source air to a predetermined elevated value and a combustor unit having a sorbent bed and fuel supply means and heat exchanger tube means disposed in heat exchange relation with the combustor bed. Compressor outlet air is directed to the heat exchanger tube means and then to the high pressure turbine inlet to drive a high pressure gas turbine. At least a part of the pressurized turbine exhaust air is directed to the combustor unit to be reheated and to fluidize the bed and support fuel combustion therein. The preheated combustor outlet gas is cleaned to provide hot turbine parts protection against degradation otherwise due to carryover from the combustor unit. The cleaned and reheated gas is directed to a low pressure gas turbine inlet to drive the low pressure turbine. The exhaust gas is directed from the low pressure turbine to heat recovery means to provide additional energy for power plant operation. The operating level of said combustor system is suitably controlled.

DESCRIPTION OF THE PREFERRED EMBODIMENT

Figure 1:
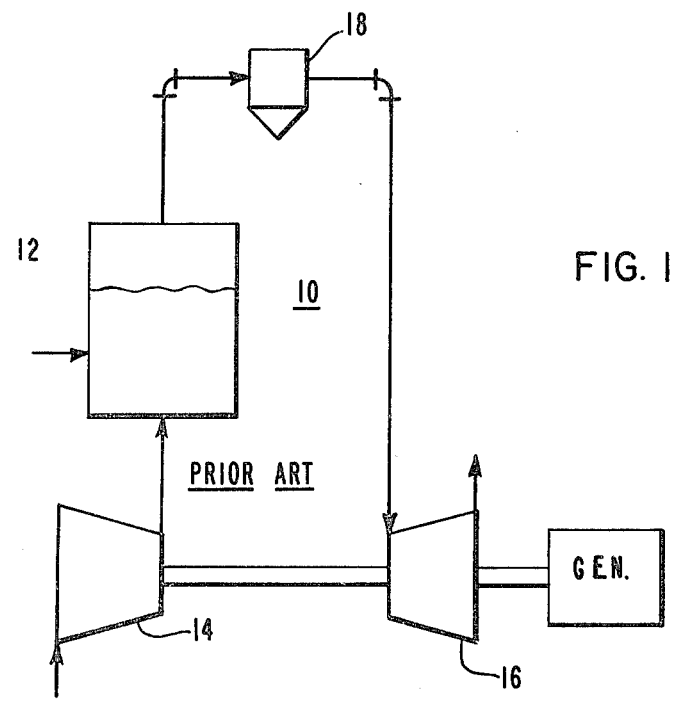
FIG. 1 shows a typical prior art system employing a pressurized fluidized bed combustor.

In a typical prior art PFB power plant 10 shown in FIG. 1, coal is fed to a PFB combustor 12 along with compressed air supplied by a compressor 14 which in turn is driven by an expander gas turbine 16. The resulting hot gases are cleaned by system 18 and expanded through the turbine 16. Combustion products directed to the high pressure/high temperature turbine 16 need to be adequately cleaned to prevent turbine operational problems of corrosion, erosion, and deposition resulting from materials generated from within the bed.

At typical combustor outlet gas temperatures (say 1600° F.) state-of-the-art cleanup system (mainly multistage cyclones) may with high ruggedization reduce turbine erosion and corrosion to acceptable levels. However, as a result of the prior art PFB system design, turbine deposition is a problem because alkali vapors, which are generated in the combustion products at the typical combustor outlet gas temperature, are not removed from the hot gas and are passed to the turbine 16 where they function as a "glue" for deposition of particulate matter on the hot turbine parts. Further, with improvement in the capabilities of cleanup equipment as the state of the art develops, the prior art PFB system design limits the extent to which higher efficiencies can be achieved.

Figure 2:
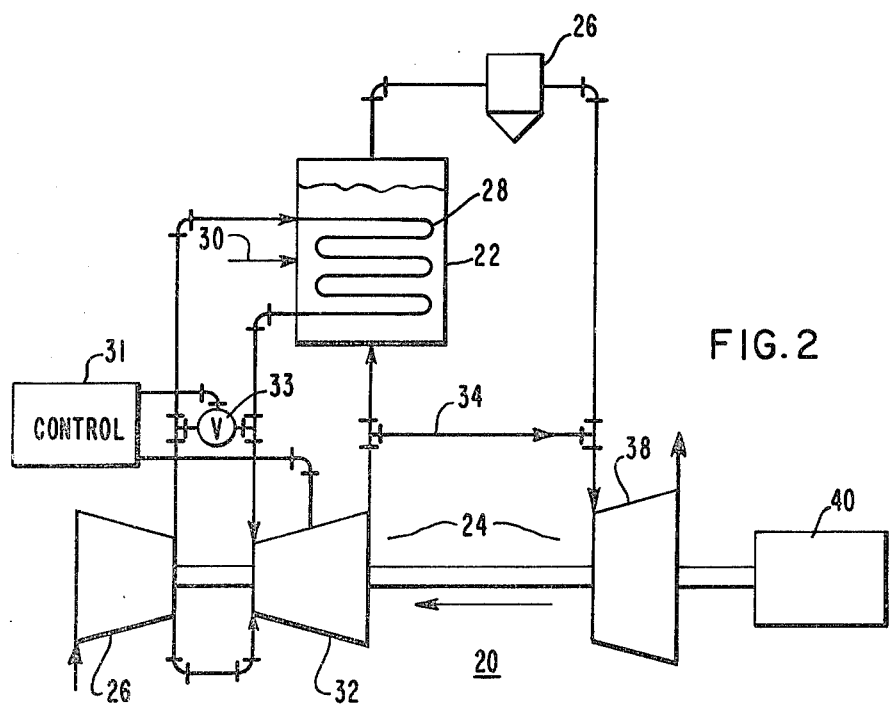
FIG. 2 shows a schematic diagram of a reheat pressurized fluidized bed (PFB) combustor system arranged in accordance with the principles of the invention.

More advantageously, there is shown in FIG. 2 a reheat PFB system 20 in which a PFB combustor 22 and a combustion turbine system 24 are arranged to operate in accordance with the principles of the invention with improved efficiency and reduced risk of hot turbine parts degradation due to carryover of particulates from the PFB combustor 12.

Generally, clean atmospheric air is compressed to a pressure such as 12 atmospheres by a compressor 26 and directed to a tubular heat exchanger 28 which is disposed in a hot fluidized bed within the PFB combustor 22. The clean air is heated in the tubes to a temperature such as 1500° F. by the combustion of coal which is supplied to the bed as indicated by the reference character 30.

The clean and hot pressurized air is directed to the inlet of a high pressure (HP) turbine 32 where it is partially expanded to a reduced pressure such as 4 atmospheres thereby providing at least most of the power needed to drive the compressor 26. The HP turbine exhaust air also has a reduced temperature such as 1100° F. and is directed in part (such as one third) to the PFB combustor 22 where it fluidizes the combustor bed, supplies the oxygen needed for combustion of the coal, and becomes pressurized and reheated to a temperature such as 1600° F.

The HP turbine 32 thus operates on clean air and can be embodied by use of a conventional turbine type without advanced turbine design or other special protection against degradation from PFB hot gas outflow. Plant control is based on control of HP turbine inlet air temperature by a controller 31 which regulates heat exchanger bypass valve 33 and HP turbine inlet guide vanes (not indicated).

The other two-thirds of the HP turbine exhaust bypasses the PFB combustor 22 as indicated by the reference character 34 and is blended with the hot gas outflow from the PFB combustor 22 after such outflow has been cleaned by a multi-stage cyclone or other suitable cleanup system 36.

The blended flow may have a temperature such as 1300° F. which constitutes a value raised by reheat above the HP turbine exhaust temperature but significantly reduced by blending dilution from the 1600° F. temperature of the combustion products outflow from the PFB combustor 22.

The blended flow is directed to a low pressure (LP) turbine 38 where it expands to drive an electric generator 40 and provide any additional power needed to drive the compressor 26.

Figure 3:
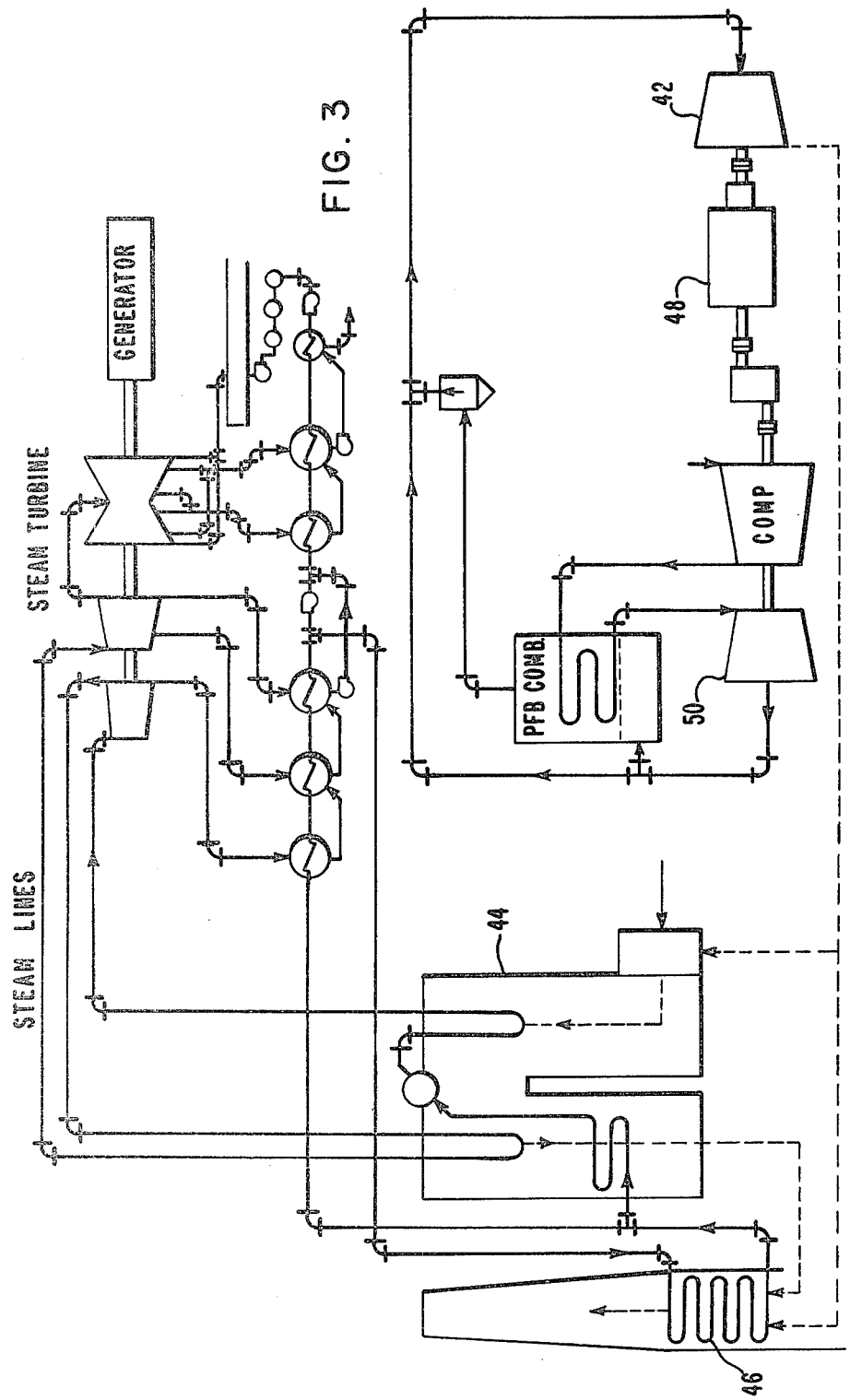
FIG. 3 shows an embodiment of the invention in which a reheat PFB system is employed in a plant repowering arrangement.

The LP turbine exhaust normally is ducted (not shown in FIG. 2) to a heat recovery system or an existing boiler to produce steam for a steam generator. An example of a steam plant repowering application is shown in FIG. 3 in which an LP gas turbine 42 supplies hot air to an existing boiler 44 to reduce boiler fuel flow as well as to a stack where boiler feedwater is heated in a gas cooler 46. An HP gas turbine 50 combines with the LP turbine 42 in driving a generator 48, and otherwise operates as described in connection with FIG. 2. Steam from the boiler 44 drives a steam turbine generator.

As a result of the operation of the system shown in FIG. 2, or as applied in FIG. 3, the high temperature turbine 32 need not be ruggedized since it handles clean, hot air which poses no special problem regarding hot turbine parts life or fouling. The PFB expander or LP turbine 38 handles a relatively cool gas stream (below 1300° F. in this case) in which the particle concentration level has been significantly reduced by dilution with clean air making it feasible and reasonable to ruggedize its design against erosion and other degradation. Alkali materials are dry and non-sticky at the relatively low gas temperature so that hot turbine parts degradation through deposition and corrosion, not otherwise avoided by the cyclone cleanup system, is substantially reduced or avoided. In addition, overall cycle efficiency is enhanced by the effect of reheat in the expansion process, and the PFB combustor 22 operates at a moderate pressure, simplifying the coal and sorbent feed system requirements and improving the performance of the cyclone separators.

In implementing the invention, the following additional information applies:

A. PFB Combustor System

The PFB combustor system is arranged according to the combined cycle in which it is to be operated. A large variety of cycle configurations of turbines with a PFB combustor system are possible with differing heat rates in accordance with the principles of the invention in both repowering and new plant applications.

In general, the various possible combined PFB cycles can be characterized by high or low excess air. Excess air refers to the total combustion air flow compared to stoichiometric air flow. Except for adiabatic beds, the actual excess air in the PFB combustor normally is about 30 percent.

In the low excess air cycle, all combustion turbine air flows through the PFB combustor and is utilized in the combustion process. This type of cycle is characterized by a high percentage of total kilowatts produced by the steam system, and its overall efficiency is strongly affected by the steam cycle. High excess air cycles have a higher percentage of the total power produced by the combustion turbine.

The bed pressure level can differ according to the location of the PFB within the thermodynamic power cycle. Pressure levels ranging from one to many atmospheres can be obtained. The choice of high or low excess air (plus the choice of adiabatic, air cooling, or steam cooling in the bed) coupled with bed pressure level produces a wide range of cycle options.

B. PFB Combustor

In the present embodiment, PFB air heating occurs in two identical skirt-supported modules, each of which is 35 feet, 2 inches in diameter and 52 feet tall. The modules operate in parallel. Each unit contains a 34 foot outer diameter by 20 foot 6 inch annular shaped fluidized bed that submerges a horizontal tube bundle. Each tube bundle contains 768 identical 1⅜ inch outer diameter by 0.165 inch wall 310 stainless steel tubes. The effective heat transfer length of the tubes is approximately 61 feet.

The tubes are bent into a serpentine shape, arranged and supported in groups of four to yield 192 elements. The four loop-in-loop arrangement is typical of the heat recovery section of a conventional electric utility steam generator. The four tubes in each element make four 14 feet ¾ inch long runs across the bed with a bend radii of 3 inches. The tubes measure 90 inches from the bottom tube to the top centerline.

After bending and assembly, each element is bent to a 12 feet 6 inch radius and positioned in the annulus to coincide with the 192 involutes that spiral on 2⅜ inch centers from the circumference of the 12 feet 1¼ inch diameter starting circle. The starting elevations of the tube elements alternate by 3 inches and yield a staggered or triangular-shaped tube pattern having 4¾ inch horizontal tube centers with a 3 inch altitude. Through the 12 feet 6 inch bend radius, the elements closely approximate involutes. Spacing between the elements and tubes is uniform throughout the entire annulus. The bed fluidizes uniformly without channeling or segregation, and the air distributes itself uniformly among the 768 tubes.

Tube elements are supported by a hook and ladder arrangement in which the hooks engage rings attached to the annulus inner and outer boundaries (core and periphery). By cutting lead-in and lead-out tubes outside the core region, it is possible to pull an individual element out of the tube bundle into clear space provided above the bed for maintenance or replacement.

Headers and transport pipes that supply and remove air from the elements are inside the core to protect them from the 1650° F. bed temperature. Air enters the module by two 24 inch OD pipes that straddle the centerline and eventually connect in a 48 inch manifold near the top of the core. The manifold connects and delivers air to a one inch thick 24 inch OD inlet ring header by two 14 inch OD pipes in a spoke-like arrangement. The ring header is fabricated from ASME SA 106 pipe bent to a 3D radius to yield a 12 feet mean diameter.

The tubes bend off from the elements and enter the header radially. Because of the large number of tubes, bifurcates are used to reduce the number of core and header penetrations and provide a reasonable ligament spacing in the latter. The bifurcates reduce the 768 1⅜ inch OD tubes to 384 2⅜ inch OD tubes which are welded to the core by a thermal sleeve arrangement to provide a gas-tight bed-to-core seal.

While passing through the 1650° F. bed, air is heated from 645° F. to 1500° F. and its volumetric flow rate is doubled. To keep pressure losses at desired values, the discharge air is collected from the elements in this case by two 24 inch OD 2 inch thick Incoloy 800H outlet by two inch OD spoke-type feeder pipes that transport the heated air from the PFB module.

C. Combustion Air Supply And Exhaust

Combustion air is delivered to each PFB module at a rate of $1.38 \times 10^6$ lb/hr at 1100° F. and 59 psia. The air enters the unit radially through two 24 inch OD thermal-sleeved nozzles 180° apart. From these nozzles, the air discharges to a stainless steel doughnut-shaped air distribution plenum/duct between the core and the pressure shell. The duct is 71 inches wide, 36 inches high, with a 10 feet 7 inches inside radius. It is reinforced with internal pipe stay braces. The exterior of the side walls and floor are insulated. The roof of the plenum/duct is the floor of the fluidized bed and contains approximately 3200¾ inch tee-shaped nozzles with approximately 5½ inch square pitch. Air enters the tee-shaped distributors, loses approximately 1 psi pressure, and discharges into the bed 6 inches above the top of the duct. The arrangement provides approximately six inches of slumped bed material on top of the duct to insulate the duct from the 1650° F. bed temperature.

The doughnut-shaped duct is supported every 30° by knee-shaped braces welded to the core and the pressure shell. Ceramic slide pads are provided at each brace, and the duct is keyed and guided radially outward from the module's centerline. Through this arrangement, the duct can accommodate the 2¼ inches of radial thermal growth caused by the 1100° F. combustion air temperature without overheating the support steel, or feeding combustion air to the bed nonuniformly.

The duct cross section is large enough to permit necessary repair work. A flexible solids shield at the top of the duct at the inner and outer boundaries prevents bed material from filling the clearances between the core, duct, and shell.

Upon passing through the air distribution tees, the air/flue gas flows vertically up through a 24 inch tube-free region, passes through a 90 inch tube bundle, collects in a 16 foot 6 inch tall freeboard, and exits via an 8 foot ID refractory-lined outlet nozzle provided on the module centerline. Immediately above the nozzle the flue gas splits and turns 90° into two 4 foot 8 inch ID refractory-lined transport pipes sized to yield a 50 fps gas velocity. By removing a bolted elliptical head above the split point, workers can gain direct access to the tube bundle region for major maintenance work, such as replacing leaking tubes.

The module freeboard height and nozzle inside diameter are sized to permit fully-assembled tube bundle elements to be brought into the unit. By cutting the element lead-ins and lead-outs, entire elements can be lifted from the bundle and repaired or replaced by people working in the freeboard region. For normal inspections and relatively minor repair work, personnel enter the module through manways provided in the pressure shell.

D. Coal And Limestone Feed

Coal and limestone are injected into the PFB in a 24 inch high tube-free region above the air distributor duct. The feed lines for these materials penetrate the shell radially. Each feeds approximately 10 square feet of bed floor area.

Two Petrocarb coal injector trains and two limestone injector trains are used to feed each PFB module. One train of each material supplies the inner ring of feeders. The second trains supply the outer ring. If one Petrocarb train becomes inoperative, coal is still fed uniformly to the bed with the module operating at part load. Because of high PFB heat fluxes, a double wall concentric pipe arrangement with insulation packed in the annulus is provided to prevent coal caking in the feedlines. Most of the heating is in the last inch of the feed-pipe because of the high end heat flux. Ignoring slip, the residence time of the coal in this zone is approximately 0.003 seconds.

In the radial arrangement, the feed pipes are not aimed at the tubes, and all piping bends are external to the unit. If a radial feed line plugs, it can be "rodded out" by someone working outside the module. Since pipe bends are subject to erosion, placing these bends outside the module permits a rupture to be detected quickly.

E. PFB Insulation Design

A 6 inch thick dual layer refractory lining protects the air heater pressure shell and core section from the 1650° F. PFB temperature. The lining consists of 3 inches of Harbison-Walker Hargun ES castable Gun Mix for abrasion resistance, backed by 3 inches of Harbison-Walker Lightweight Gun Mix 20. The former contains 2 percent by volume Meltex No. 19–35 (Type 303 stainless steel) melt extracted fibers.

F. Hot Gas Cleaning System

The choice and specification of the hot gas cleaning system for a PFBC system depends on a wide variety of parameters. It is useful to separate the problem into its three major components:

- Carry-over of solids from the combustor into the gas cleaning system;
- The degree of removal required (environmental or turbine tolerance constraints);
- Choices of available equipment that are capable of taking the particular input gas stream to the desired outlet conditions.

G. Particle Carry-Over

The following major factors influence particulate carry-over from the fluid bed combustor:

1. Coal Choice

A primary factor is the ash content of the coal. Since PFBC ash is generally not very dense and is quite friable, a large fraction of the ash fed to the bed eventually becomes entrained in the flue gas and enters the cleanup system. In most situations, ash is the predominant solid contaminant in the flue gas. The sulfur content of the coal indirectly contributes to the particulate loading from the bed since higher sulfur content leads to higher sorbent feed rates, which naturally generates more sorbent fines in the overhead.

2. Sorbent Choice

Fines from the sorbent are carried over from two separate causes. The first is the elutriation of the fraction of fines in the feed which are sized such that their terminal velocity is lower than the bed velocity. Grinding and screening techniques in preparation can greatly influence this source. The second source of sorbent fines is the attrition of bed material during operation. An attrition-resistant material is of primary importance in dealing with this source of fines. Over the past several years Westinghouse has carried out extensive research in this area, and has developed both the theoretical and experimental tools to make appropriate choices and performance projections for sorbent chemical activity and its physical resistance to attrition.

3. Operating Parameter Choices

Several parameters dealing with the actual operating conditions of the bed significantly affect carry-over. The important choice is superficial velocity. The total carry-over from a particular bed is approximately proportional to the square of the superficial velocity. This arises mainly from increased fraction of the feed sorbent and ash whose terminal velocity is exceeded. It is also a reflection of increased attrition rates due to more energetic collisions. The decision to recycle fines with a primary cyclone (determined by combustion efficiency and sorbent utilization considerations) can have a large effect on the total fines loading and size distribution. If a fairly efficient recycle cyclone is used, a large inventory of fine material is built up in the recycle loop. The mass of material escaping the recycle cyclone into the cleanup system is generally slightly lower than non-recycle systems. However, it is usually finer and much more difficult to remove in subsequent inertial separators. Other operating and design choices such as bed depth which affects attrition rates, feed techniques and bed geometry, can have significant though usually lesser effects on carry-over.

4. Hot Gas Cleanup Train Choices

If the choice of particulate removal devices is limited to those commercially available, high temperature and pressure cyclones are selected. Most often, a cyclone system is specified to deal with the wide range of particle sizes a PFB combustor generates. Cyclones also minimize captial cost, pressure loss, and erosion while maintaining high overall efficiency.

This is most effectively accomplished by staging cyclones in series, starting with a few large diameter, low pressure drop, low velocity devices to remove the largest most erosive materials. Such cyclones may be as large as 10 to 15 feet in diameter and capable of handling flows up to 200–400,000 acfm. The first stage is followed by cyclones from 3 to 9 feet in diameter. The number of these cyclones increases roughly by the square of the decrease in diameter, and pressure drops will increase slightly.

If a final "polishing" stage of cleaning is required, two options are open: a large array of very small (6 to 10 inch) diameter cyclones in a multiclone unit; or 3 to 4 feet diameter units at relatively high inlet velocities (80–120 ft/sec). In cat cracker operations, where the dust is free flowing, the multiclone option is frequently chosen. In PFB applications, it is believed that auto-adhesive dust would eventually lead to plugs and subsequent flow unbalances in multiclone systems. For this reason, it is more prudent to employ a final stage of relatively large 3 or 4 foot diameter, high velocity cyclones. The penalty paid in plant economics and complexity increases sharply with this attempt to remove the last 0.5 to 1 percent of the inertially separable dust.

5. Gas Cleaning Requirements

The degree of hot gas cleaning can be dictated by environmental regulations or the tolerance of the turbine expander (LP turbine). Environmental regulations are stringent for reasonably straightforward. Usually; the controlling regulations are EPA New Source Performance Standards, which call for the emissions to be less than 0.03 lbm/$10^6$ BTU. For PFBC plants, this corresponds to roughly 30 PPM, or an overall particulate removal efficiency of 99.8 to 99.9 percent. To date, no restrictions are known to have been imposed on the emission distribution of size.

6. Advanced Cleanup Systems

High temperature filtration systems are undergoing continuing development. These include ceramic fiber bag systems, woven or fibrous felts, ceramic membrane filters, and granular bed filters.

Generally, as these devices are improved they are expected to achieve NSPS requirements and turbine tolerances over an increasingly wider range of combustor designs and coal/sorbent choices.

H. Turbine-Generator System

The turbine generator system for the reheat PFB system is a single shaft machinery set including the following major elements:
Compressor and HP turbine
Reduction gear and starting package
Electric generator and exciter
LP turbine (PFB expander)
Control and auxiliary systems I. Compressor And HP Turbine The compressor and HP turbine unit are based on the W501, a current combustion turbine produced by Westinghouse Electric Corporation. The HP turbine/compressor operates at 1500° F. well within state-of-the-art combustion turbine operating levels (above 2000° F.).

The following design features make the HP air turbine for the PFB system different from conventional combustion turbines:

All the compressed air must be removed from the engine casing for delivery to the air heater unit, and is returned to the turbine element at 1500° F.

Thermal shock and fatigue loading on the turbine hot parts are greatly reduced by indirect heating in the PFB air heater unit.

The turbine operates on clean heated air rather than on combustion products, which often contain contaminants that contribute to corrosion and can otherwise affect hot parts life.

In the present embodiment, compressor airflow is approximately 775 lb/sec. Power coupling on the cold or compressor end of the machine allows hard coupling to the reduction gear and eliminates the need for flexible couplings. Turbine and compressor blading can be serviced or replaced with the rotor remaining in place in the lower half of the casing.

TABLE 1-1
AIR TURBINE DESIGN DATA SUMMARY
(BASIS: WESTINGHOUSE MODEL W501)

| GENERAL EQUIPMENT DESCRIPTION | |
|---|---|
| Rated, Speed, rpm | 3600 |
| No. Compressor Stages | 19 |
| No. Turbine Stages | 2 |
| Rotor Bearing Span, Inches | 288 |
| Rotor Journal Bearing Size | 16 |
| Thrust Bearing Size, Inches | 21,500 |
| Rotor Weight, lbs. | 73,120 |
| Rotor WR2, Lb-in2 | 25,411,000 |
| Lube Oil Heat Load, Btu/Min | 58,500 |

COMPRESSOR ELEMENT - SELECTED STAGE DATA

| Stage | Mean Dia. | Blade Height | Blade Angle @ Mean Dia. |
|---|---|---|---|
| 1 | 56.3 In. | 17.8 In. | 32.0° |
| 5 | 60.0 In. | 9.8 In. | 33.0° |
| 10 | 56.4 In. | 6.4 In. | 30.6° |
| 19 | 53.0 In. | 3.0 In. | 27.7° |

Blade Material: 12% Cr Stainless Steel

TURBINE ELEMENT DESIGN DATA

| Stage | Mean Dia. | Blade Height | Blade Angle @ Mean Dia. | Material |
|---|---|---|---|---|
| 1 | 32.46 In. | 5.3 In. | 32.2° | Udimet 720 |
| 2 | 32.86 In. | 8.1 In. | 32.8° | Udimet 720 |

J. Reduction Gear Starting Package

A reduction gear is required to couple the 33600 RPM turbo/compressor unit to the 1800 RPM expander turbine generator. The reduction gear and starting package are based on proven, field tested components.

The starting system consists of an electric motor and a turning gear drive unit. It has several functions applicable to the main turbine-generator rotating equipment. First, it provides the breakway torque necessary to accelerate the shaft from a standstill. Second, it provides the necessary torque to accelerate the shaft system to self-sustaining speed. Third, it provides the torque necessary to slow roll the shaft system after a shutdown, to prevent thermal distortion or bowing of the rotor shaft.

K. Electric Generator

The electric generator is a conventional hydrogen-cooled unit. The rotor is a non-salient pole type: magnetic poles are not distinguishable. This design is characterized by surface smoothness and relatively small diameter, allowing tight clearances between the rotating and stationary parts to minimize windage losses. The exciter is the brushless design directly driven by the generator shaft.

L. LP Turbine

The low pressure (LP) turbine or expander is the single element of the power train that employs a design different from conventional combustion turbine machinery. To minimize potential erosion, corrosion, and deposition carried from the PFB combustion products cleanup system, special design characteristics are incorporated into the LP turbine and the thermal cycle.

Inlet temperature is kept below 1300° F. to insure that alkali material condenses and solidifies before entering the blade path.

Gas velocity relative to the blading is kept below 800 ft/sec to minimize erosion.

Blade rotational speed is kept under 1000 ft/sec to minimize erosion from secondary flow and centrifugal field concentration of particulate matter.

Increased blade chords (low aspect ratio), interrow spacing, and trailing edge thickness make a more rugged blade.

Blade coating or cladding increases resistance to corrosion and erosion.

Axial flow inlet reduces particulate concentrations.

Figure 4:
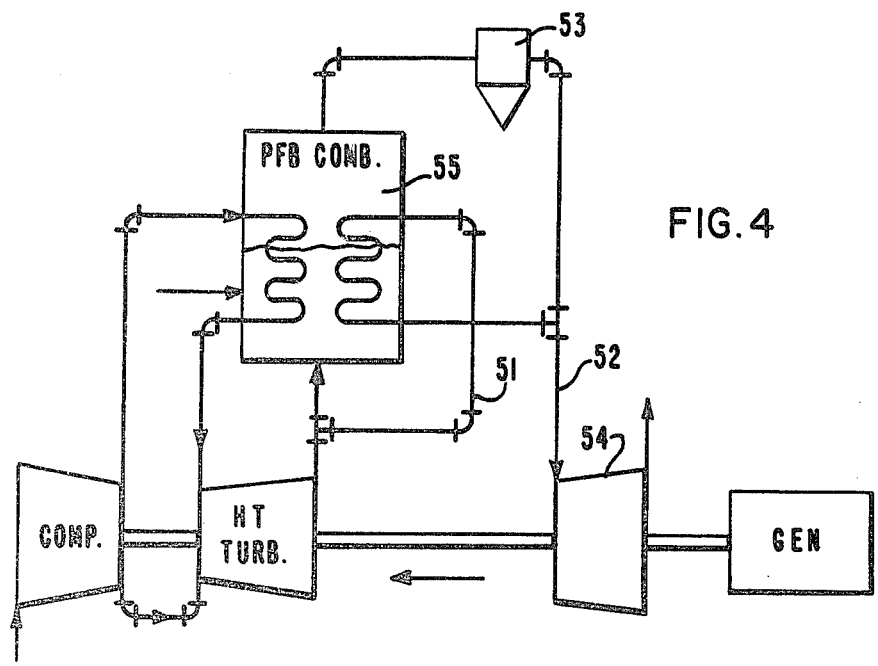
FIG. 4 shows embodiment of the invention which operates with a higher reheat temperature.

These design characteristics provide a basic "ruggedized" turbine that can be upgraded in operating temperature from under 1300° F. to 1650° F. without major changes for use in either the FIG. 2 or the FIG. 4 embodiment. However, the ruggedization employed is readily achieved by state-of-the-art techniques as compared to the special high ruggedization required by the prior art described in connection with FIG. 1.

| LP TURBINE DESIGN | |
|---|---|
| Speed | 1800 rpm |
| No. of Stages | 3 |
| Inlet tip diameter | 121148 in. |
| Inlet hub diameter | 105852 in. |
| Exhaust tip diameter | 128544 in. |
| Exhaust hub diameter | 8805 in. |

| GAS VELOCITY RELATIVE TO BLADE (MEAN) | | |
|---|---|---|
| | Inlet Temperature | |
| Row | 1200° F. Ft/sec | 1650° F. Ft/sec |
| 0 | 424.9 | 551.4 |
| 1 | 617.4 | 850.7 |
| 2 | 560.1 | 802.3 |
| 3 | 552.1 | 776.4 |
| 4 | 526.1 | 727.5 |
| 5 | 516.0 | 595.6 |
| 6 | 510.4 | 582.3 |

Maximum wheel spaced, last row tip equals 1009.6 ft/sec.

M. Turbine Generator Control System

The turbine control for the PFB plant application is both simple and inherently reliable. The control strategy for the overall PFB system is based on employing a main control variable (HP turbine inlet temperature) which is external to the air heater to maintain relatively constant bed temperature for optimum sulfur capture and rapid load response. Such control regulates engine air flow between 100 percent and 85 percent load and allows the turbine and bed to run at constant temperature over that range. Since the turbine expansion ratio decreases with decreasing flow, the turbine exhaust temperature rises slightly over this range of control.

Below 85 percent load, the HP turbine inlet temperature is decreased through an air heater bypass, which allows compressor discharge air to blend with heater outlet air to obtain the required turbine inlet temperature. The bed temperature is thus maintained at an almost constant level to provide an important advantage for both sulfur capture and combustion efficiency. Also, by maintaining bed material, tubes, and casing at a fixed temperature, load increases can be fairly rapid since thermal inertia becomes an asset rather than a hindrance. This approach also exploits the characteristics of the single shaft combustion turbine where the compressor load is continously applied to the power producing turbine element. In this case, the idle, or minimum net power setting, is reached with about 25 percent of full-load flow still passing through the air heater tubes. Therefore, even at full bypass conditions, there is a significant flow of cooling air passing through the air heater tubes.

The two primary control elements, the inlet guide vanes (IGV) and the air heater bypass, provide the steady state regulation and load change functions. For rapid load decrease as required for overspeed protection, a compressor discharge to turbine exhaust bypass and a LP turbine bypass and a LP turbine throttle valve are provided. These valves function when a rapid load dump is required. The control system restore these valves to the closed position with the IGV and the air heater bypass.

The compressor discharge to turbine exhaust bypass is integrated with the coal feed by the control system. This integration prevents bed overtemperature during a rapid load decrease by simultaneously decreasing the coal feed rate. During this transient, the fuel air ratio control delays cutback of bed air flow to further reduce the bed temperature.

As the vane angle is decreased (toward closed), the inlet air flow to the compressor is reduced. This, in effect, shifts the 3600 rpm constant speed line on the compressor pressure ratio vs. flow map to the left. This also increases compressor surge margin at lower flows. Therefore, the IGV control is also used during startup to prevent surge as the compressor accelerates through the lower speed range.

The air heater bypass starts to open as the turbine inlet temperature setpoint is reduced to decrease load or speed. As flow bypasses the heater tubes, the outlet temperature from the heater rises toward 1600° F. This tends to increase the amount of bypass needed to achieve a given turbine inlet temperature setting. Turbine power output varies with inlet temperature, and 76 percent bypass is required to match the full speed idle setting with no throttling in the heater tube circuit. Since this amount of bypass requires a very large pipe and valve, a throttle valve may be used in the heater circuit to reduce the size of these items. The throttle valve acts after the bypass is fully opened to increase pressure drop. It not only decreases the size of the bypass pipe and valve required to pass the flow, but it also decreases the amount of bypass needed by increasing the idle turbine inlet temperature.

Compressor discharge (CD) and LP turbine bypass (TB) valves provide a rapid means to unload the turbine to prevent an overspeed condition as might be required if the generator breaker trips at full load. The CD bypass provides for dumping a portion of compressor discharge air directly into the turbine exhaust. Simultaneously, a vent opens at the TB inlet to depressurize rapidly the PFB shell and cleanup system. These provisions are needed to control turbine speed in the event of a load loss.

N. System Startup

A relatively simple and rapid startup procedure is provided for the PFB system. An auxiliary startup burner is incorporated into the high pressure air heater bypass line where, under normal operating conditions, no system pressure loss is introduced. The burner is used during startup to fire the combustion turbine and allow the unit to reach self-sustaining synchronous speed in twenty minutes or less. At this point, the temperature of the fluid bed inlet gas can be adjusted to reach about 1000° F. for coal ignition. As the bed lights off, the fuel to the startup burner is reduced, shifting from starting fuel to full coal firing.

With rapid starting, as described the external energy required to bring the plant on line is reduced.

O. Plant Support And Auxiliary Systems

Support and auxiliary systems include the following:
Coal and limestone feed
Spent material depressurization
Hot gas ducting
Coal and sorbent receiving, preparation, storage
Spent sorbent and ash handling and disposal
Flue gas cleanup (if required)
Water treatment and makeup
Blowdown and wastewater
Electrical systems 1. Coal And Limestone Feed Systems The coal and limestone feed systems are essentially the same design. Both employ a lock hopper feed system marketed by Petrocarb Incorporated of Bloomfield, N.J.

The Petrocarb system consists of a surge bin that receives the coal or limestone, a lock hopper in which the material is pressurized, a feeder vessel that feeds and distributes the materials, and a number of dense phase pneumatic transport lines. The three vessels are stacked vertically and the material feeds by gravity through valves from one vessel to the next.

The system operates as follows. Material is first fed into the lock hopper from the surge bin. The isolating valves between the lock hopper and the surge bin and the lock hopper and the feeder vessel are then closed. Pressurizing air is injected into the lock hopper, bringing it to system pressure. The isolating valve between the lock hopper and the feed vessel is then opened and material drops into the pressurized feed vessel. The isolating valve then closes and the lock hopper is vented to begin another cycle. Air is injected into the feed vessel to fluidize the material flows into the transport lines where it is conveyed in a dense phase mixture with air to the PFB combustor.

Material transport rate is controlled by varying the feeder vessel pressure and the transport air flow rates.

2. Spent Material Depressurization

Spent bed material are drained from the PFB combustor by gravity through internal refractory lined transfer pipes that penetrate the PFB combustor air distributor plate. The removal rate is controlled by butterfly valves located in the transfer lines, and the flow is directed to surge hoppers located externally to the PFB pressure vessel. From the surge hopper, spent bed material flows through an insolating valve to a lock hopper located directly under it. When the lock hopper has been filled with bed material to a predetermined level, the isolating valve is closed, the lock hopper depressurized, the outlet valve opened, and the material drained to a transport system that conveys it to cooling and disposal systems. During the time the lock hopper is being emptied, bed material continues to drain from the combustor for collection in the surge hoppers. When the lock hoppers have been emptied, they are isolated and repressurized after which the surge hopper-lock hopper isolating valve is opened to transfer material to the lock hopper to reinitiate the cycle.

Since the lock hopper isolation and drain valves are subjected to severe service, these valves are provided in pairs that operate in series (two for isolation and two for draining). The first is used to block the flow of solids, and the second provides a pressure tight seal.

3. Hot Gas Ducting

The piping systems that connect the PFB combustor to the turbo compressor and the gas turbine are capable of transporting the air or combustor exhaust gas safely and with minimum heat loss while preventing contamination with particulate matter.

The pipeline from the PFB air heater tube bundle to the gas turbine carries air at 1500° F. The line is internally lined with refractory to minimize heat loss and protect the pipe from excessive temperatures. To reduce the chance of the clean air being contaminated from refractory spalling, the refractory is covered with metallic shrouds. Internal shroud anchors are provided to absorb radial growth, permit guide axial growth, and maintain shroud alignment. Shroud slip joints prevent refractory washout and the pipes have vapor stops to prevent bypassing of the gas. The shrouded transfer lines are a proprietary design offered by the Foster-Wheeler Process Plants Division.

The pipelines leading from the combustor to the cyclone convey particulate-laden combustor exhaust gas at a temperature of 1650° F. These lines are made of carbon steel and contain two layers of internal refractory lining to protect the pipe from the high temperature gas. The layer in contact with the gas is abrasion resistant (hard facing) and protects the lightweight insulating castable behind it from erosion and abrasion. The two-component lining as anchored to the piping with carbon steel studs and stainless steel clips. Carbon steel vapor stops are employed where necessary to prevent refractory bypassing and washout.

Shrouded piping from the cyclones to the quench or mixing point carries combustor exhaust gas, which is relatively free of particulates.

The pipeline leading from the mixing point to the turbo expander is carrying blended combustor exhaust gas at less than 1300° F. and is made of alloy steel pipe with external insulation similar to insulated pipe found in cat cracking plants.

4. Coal And Sorbent, Receiving, Preparation And Storage

The coal and limestone delivery systems receive the coal and limestone and distribute them to stockpile, silo, and in-plant storage. In-plant coal and limestone silos store a 24-hour supply; coal and limestone yard silos store a seven day supply. The coal silo provides two days of active storage and five days of reserve. A yard stockpile holds a ninety day supply, which will protect the plant from long-term interruption in coal delivery.

5. Spent Sorbent And Ash Handling And Disposal

The spent stone and flyash removal system receives spent material from the cyclones, fluidized bed, and the baghouse, and delivers it to storage silos for disposal. The spent stone removal system operates continuously, conveying spent stone in a pressurized pneumatic system. Stone is removed from the air flow by a cyclone collector; exhausted air and fines are discharged to the fines material (flyash) silo; and the stone goes to the coarse material (spent stone) silo.

The flyash system operates continuously, and spent stone and flyash silos are sized to store a three day supply. Flyash is conveyed in a pressurized pneumatic system. Ash is discharged to the fines material (flyash) silo.

P. Performance Summary

Each of the two PFB modules heats $1.38 \times 10^6$ lb/h of 175 psia air from 645° F. to 1500° F. by buring coal in 1650° F. 59 psia, pressurized, fluidized beds. Combustion occurs in two 34-foot OD×20-ft-6 inch ID annular-shaped fluidized beds of 578 foot$^2$ cross-sectional area, with 20 percent excess air. (includes the air required by the Petrocarb coal and limestone pneumatic transport feed systems.)

Coal and combustion air at 1100° F., 59 psia are provided to each module at 43,100 lb/h and 389,000 lb/h respectively. Each module has a triangular-pitched tube bundle containing approximately 22,700 feet$^2$ of horizontal tube surface. Each bundle has approximately 22,700 feet$^2$ of horizontal tube surface, and 768 1⅝ OD tubes on 4¾-inch horizontal centers, with a 3-inch altitude. The bottom to top tube centerline is 7 feet 9 inches high. The PFB will operate at approximately 3 ft/sec superficial gas velocity with an expanded bed height of 10 feet 3 inches.

To meet allowable SO$_2$ emissions levels, limestone is provided at a Ca/S fuel ratio of 1.5. The limestone captures at least 90 percent of the sulfur. The PFB's operating conditions make it necessary to reinject material—elutriated from the beds and captured in the cyclones—back to the bed to enhance combustion efficiency. On this once-through basis, combustion efficiency is expected to be 99 percent, and NO$_x$ emissions are projected at 0.25 lb/10$^6$ BTU. Material will be elutriated from the bed at a rate of 9.6 gr/SCF. An outside bed-to-tube heat transfer coefficient of approximately 54 BTU/HR/ft$^2$ is expected.

The combustion efficiency and bed-to-tube heat transfer coefficients used in the design of the PFB air heater are based on values actually measured at the CURL PFB test facility on a similar Foster-Wheeler tube bundle configuration.

ALTERNATE EMBODIMENTS

In FIG. 4, another embodiment of the invention is shown in which basic elements like those in FIG. 3 are employed. However, the PFB bypass air flow in this case is directed from line 51 through a second air heater 50 in the PFB bed.

As a result, gas flow in line 52 is a blend of hot gases from the PFB bed and reheated clean turbine exhaust gases from the line 51. The inlet gas temperature for LP turbine 54 is accordingly increased such as to 1650° F. Accordingly, PFB gas cleanup system 53 is provided with added filtration capability enabling the LP turbine 54, with its ruggedized design, to tolerate the increased inlet gas temperature.

Figure 6:
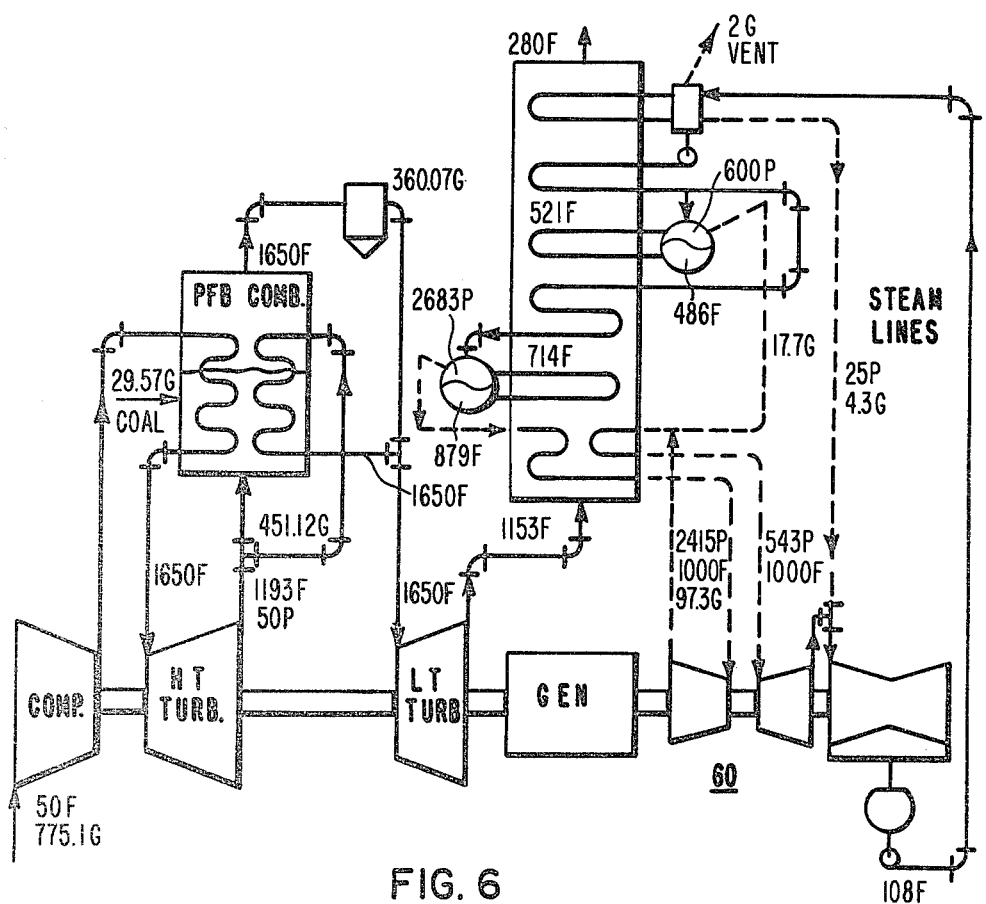
FIGS. 5 and 6 show further embodiments of the invention.
Figure 5:
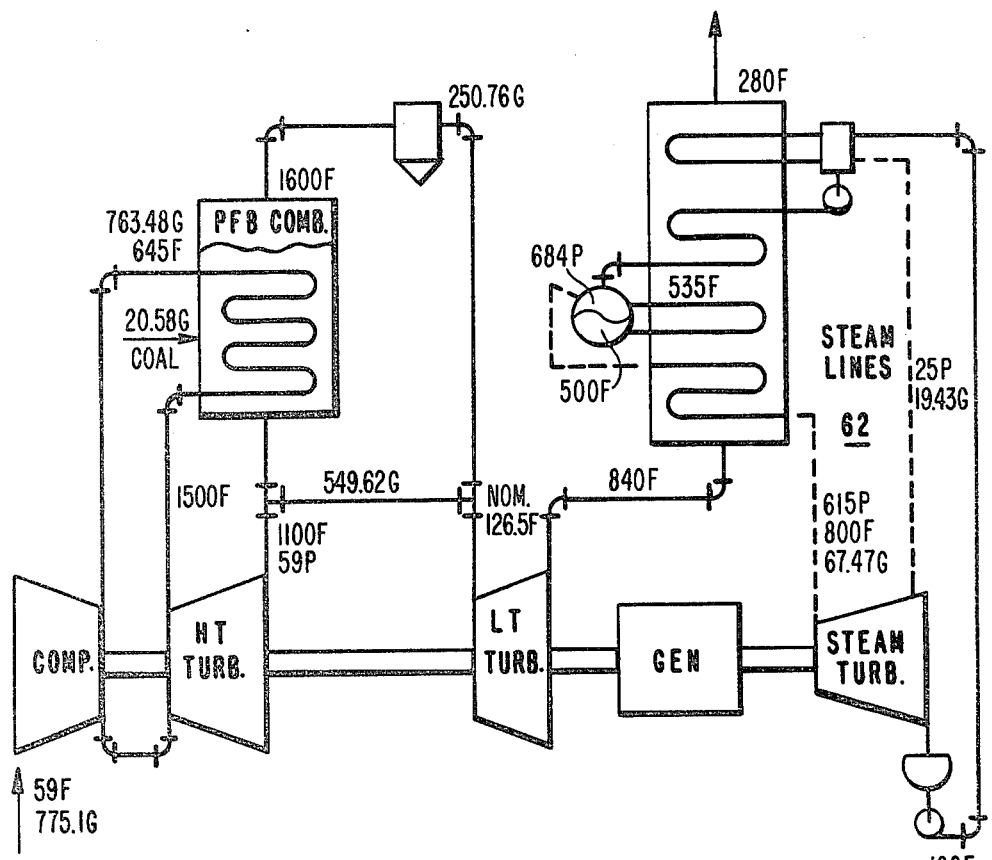

As shown in FIG. 6, the embodiment of FIG. 4, with a bed temperature of 1750° F. and HP and LP turbine inlet temperatures of 1650° F., is coupled with a 2400 psia 1000° F.-1000° F. steam system 60 to produce an overall heat rate below 8000 BTU/KWHR and a thermal efficiency greater than 43%. In FIG. 5, a steam system 62 is shown coupled to the embodiment of FIG. 3. Energy balance values are indicated for the combined cycle systems in FIGS. 5 and 6.

What is claimed is:

1. A reheat pressurized fluidized bed combustor system for a power plant comprising a compressor for pressurizing relatively clean source air to a predetermined elevated value, a high pressure gas turbine, a combustor unit having a sorbent bed and fuel supply means, heat exchanger tube means disposed in heat exchange relation with said combustor bed, means for directing compressor outlet air to said heat exchanger tube means, means for directing heated outlet air from said heat exchanger tube means to provide the complete driving gas flow to the high pressure turbine inlet to drive said high pressure turbine, means for directing at least a part of the pressurized exhaust air to said combustor unit to be reheated and to fluidize said bed and support fuel combustion therein, means for cleaning the preheated combustor outlet gas to provide hot turbine parts protection against degradation otherwise due to carryover from said combustor unit, a low pressure turbine, means for generating electric power, means for coupling said high and low pressure turbines in a predetermined arrangement to drive said generating means and said compressor, means for directing the cleaned and reheated gas to the low pressure turbine inlet to drive said low pressure turbine, and means for controlling at least one predetermined variable to control the operating level of said combustor system.

2. A system as set forth in claim 1 wherein a part of the high pressure turbine exhaust air is directed to said combustor unit bed and means are provided for directing the balance of the high pressure turbine air in a path which bypasses said combustor bed and merges said bypass air with the hot combustor outlet gases downstream from said cleaning means and upstream from said low pressure turbine inlet.

3. A system as set forth in claim 2 wherein a second heat exchanger tube means is disposed in said combustor bed and said bypass path includes said second heat exchanger tube means.

4. A system as set forth in claim 1 wherein said controlling means includes means for bypassing a portion of the compressor outlet flow around the first heat exchanger tube means to the high pressure turbine inlet to control high pressure turbine inlet air temperature.

5. A system as set forth in claim 1 wherein the combustor unit fuel is coal.

6. A system as set forth in claim 2 wherein means are provided for proportioning the bypass flow and the combustor outlet gases to result in a mixed low pressure turbine inlet gas flow at a temperature below the vaporizing temperature of carryover alkali matter from said combustor unit.

7. A system as set forth in claim 1 wherein said high and low pressure turbines are so designed structurally and the system is so designed with gas flow parameters that said high pressure turbine provides at least a major portion of the drive power for said compressor and said low pressure turbine drives said generating means and provides any additional power needed to drive said compressor.

8. A system as set forth in claim 1 wherein heat recovery means are provided and means are provided for directing exhaust gas from said low pressure turbine to said heat recovery means to provide additional energy for power plant operation.

9. A system as set forth in claim 8 and adapted for steam plant repowering wherein said heat recovery means includes means for directing a portion of the low pressure turbine exhaust gas to an air inlet for a boiler in said steam plant and a stack gas cooler which receives heat energy from the rest of the low pressure turbine exhaust gas for boiler feedwater heating.

10. A system as set forth in claim 2 wherein said low pressure turbine is structured against degradation due to combustor carryover only to the extent needed for operation below a turbine gas inlet temperature equal to about 1300° F. or less.

* * * * *